INVENTORS
Lynn W. Marsh Jr
Leo Rosen
BY James R. Hodder
ATTORNEY

Inventors:
Lynn W. Marsh Jr.,
Leo Rosen,
by James C. Hodges Attorney

Nov. 8, 1960 L. W. MARSH, JR., ET AL 2,959,349

ELECTRONIC COUNTING SYSTEM

Filed March 6, 1956 6 Sheets-Sheet 3

LYNN W. MARSH, Jr.
LEO ROSEN
INVENTORS
BY James R. Hodder
ATTORNEY

LYNN W. MARSH, Jr.
LEO ROSEN
INVENTORS

BY James R. Hodder
ATTORNEY

Inventors:
Lynn W. Marsh Jr.,
Leo Rosen,
by [signature] Attorney

| CARRY SIGNALS | DECADE COUNTER OUTPUTS a | b | c | d |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 0 | 0 | 0 | 0 | 0 |

Inventors:
Lynn W. Marsh Jr.,
Leo Rosen,
by James ? Hodd Attorney

United States Patent Office 2,959,349

Patented Nov. 8, 1960

2,959,349

ELECTRONIC COUNTING SYSTEM

Lynn W. Marsh, Jr., Baltimore, Md., and Leo Rosen, Framingham, Mass., assignors, by mesne assignments, to Anelex Corporation, Concord, N.H., a corporation of New Hampshire Filed Mar. 6, 1956, Ser. No. 569,848

14 Claims. (Cl. 235—92)

This invention relates to electronic counting systems, and to circuits used in such systems.

In our copending application, Serial No. 560,769 filed January 23, 1956, there is disclosed an electronic time-interval measuring system in which a plurality of phototubes are so arranged that the light caused by sweep of the beam of a cathode ray tube traverses each phototube in succession, one sweep being accomplished for each unit of time. Intensification of the cathode beam caused by incoming signals under observation causes temporary storage in the cathode ray tube as a function of the phosphor decay-time characteristic. Phototubes, opposite the brightened spots caused by the intensified beam, control circuits which provide accurate measurements of time intervals by allowing for discrimination between high speed counts to be effected at much lower speeds.

Our present invention differs from the one of our said application in that instead of controlling the cathode ray tube beam sweep by time signals, and intensifying the beam by incoming signals, the latter control the position of the beam, and the time signals cause intensifying of the beam. The beam is advanced in steps corresponding to the positions of the phototubes, each incoming signal advancing it one step from opposite one phototube to opposite the next adjacent phototube. At the end of any time interval, the beam is intensified, and one or more phototubes receives sufficient light to produce an output signal. The output signals of the phototubes are used to facilitate count of the incoming signals.

An object of this invention is to provide means for storing a count occurring at a relatively high speed, and for sampling the count at a relatively low speed.

Another object of this invention is to control the position of the beam of a cathode ray tube by signals to be counted, and to intensify the beam at predetermined time intervals.

Other objects of this invention will be apparent from the following description taken with the annexed drawings.

This invention will now be described in connection with the annexed drawings, of which:

Fig. 7 is a circuit schematic of a sampling pulse generator that can be used in Fig. 1;

Figure 1:
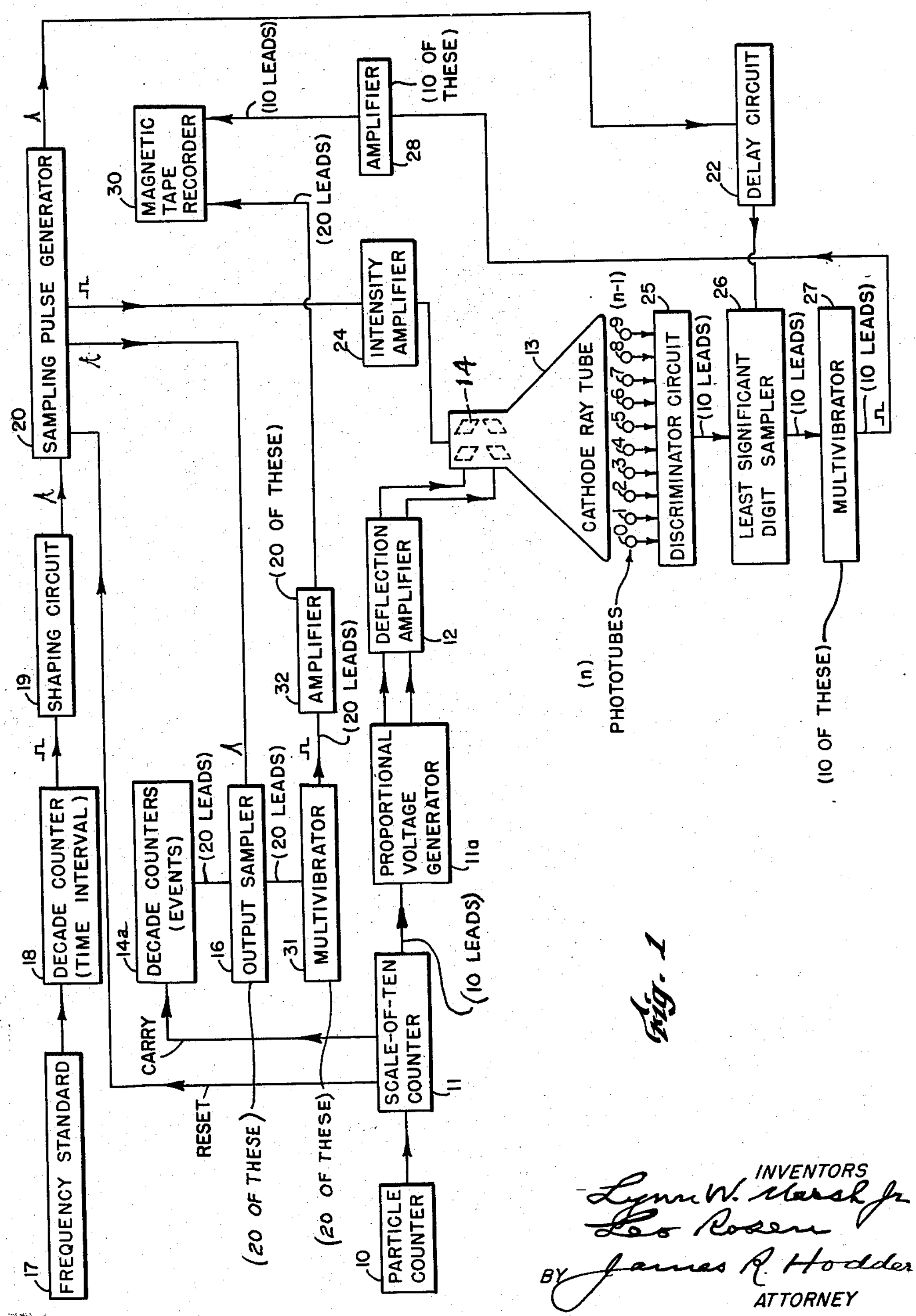
Fig. 1 is a block diagram of an electronic counting system embodying this invention.

The system shown by Fig. 1 is one designed to measure the number of events within a predetermined time interval, which events may, for example, be the output pulses from a particle counter 10. The latter may supply output pulses at a varying rate of from zero per second to ten million per second into a conventional scale-of-ten counter 11. The output of the latter supplies vertical and horizontal deflection voltages, through a proportional voltage generator **11*a* and a conventional deflection amplifier, 12, to the corresponding deflection electrodes 14 of a conventional cathode ray tube 13. The counter 11 also supplies output voltage pulses to the input of a conventional event decade counter 14*a* which may include five counters with four leads each, making twenty output leads which are connected to the input of an output sampler 16**.

Figure 5:
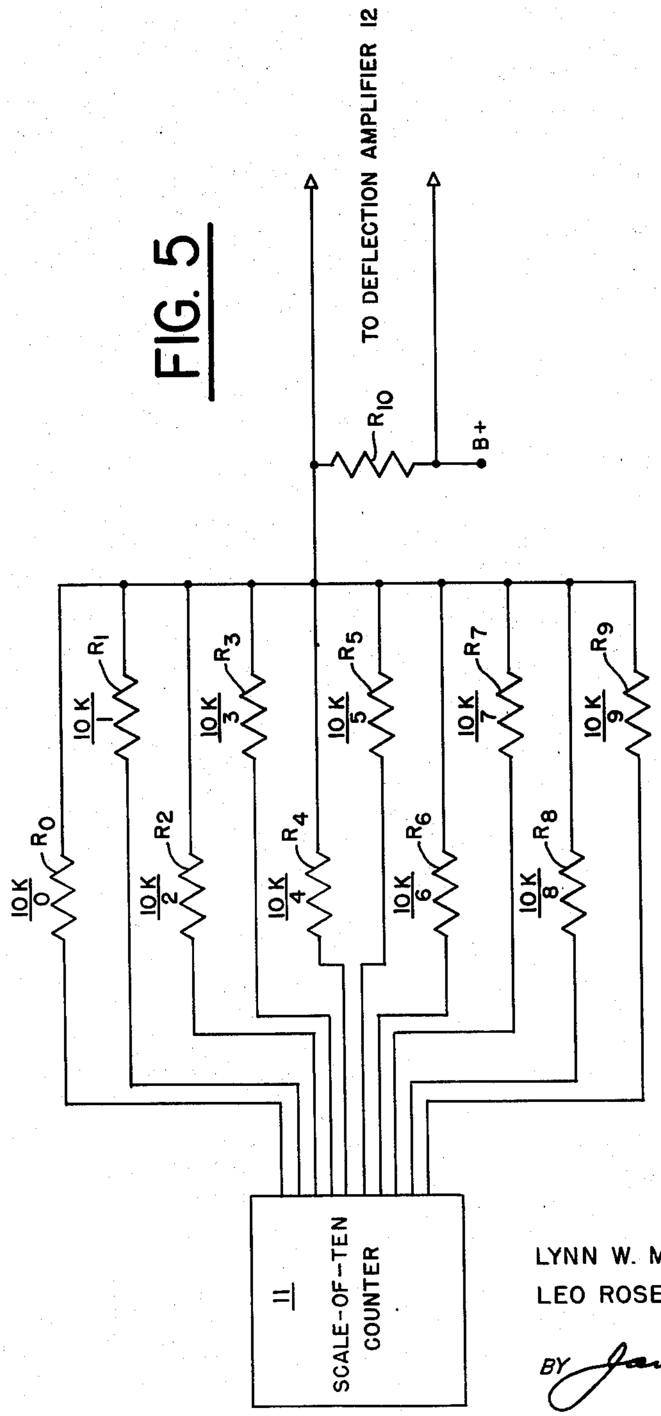
Fig. 5 is a circuit of a proportional voltage generator that may be used in the system of Fig. 1.
Figure 8:
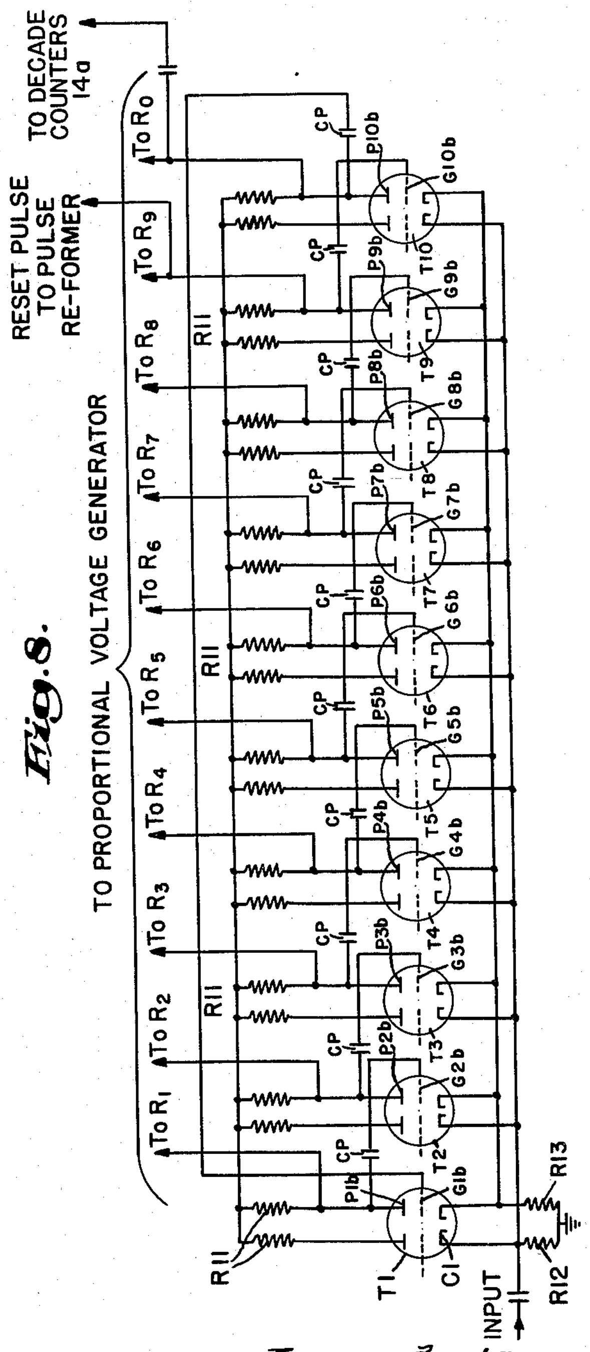
Fig. 8 is a circuit of a scale-of-ten counter that can be used in Fig. 1.

Fig. 8 shows the circuit of a typical ring counter that can be used for the scale-of-ten counter 11. This circuit is a copy except for the number of stages, and the output take off leads, of Figs. 11–21 of the of the textbook "Pulse and Digital Circuits," by Millman and Taub, published in 1956 by McGraw-Hill. For sake of simplicity, the coupling resistors and commutating capacitors are not shown. It has ten dual triodes T1–T10. The input signal from the particle counter 10 is applied as a negative voltage to the cathode C1 of triode T1. Cathode C1 and the other left cathodes are connected together and through a resistor R12 to ground. The right cathodes are connected together and through a resistor R13 to ground. The plates of the triodes are connected to load resistors R11. B+ is applied as shown by Fig. 5, through a common resistor R10. There is coupling through capacitors CP from plate $P1_b$ of the triode T1 to the grid $G2_b$ of triode T2, from the plate $P2_b$ of triode T2 to the grid $G3_b$ of the triode T3 and so on, each right plate being coupled to the right grid of the succeeding triode. The plate $P10_b$ of the last triode T10 is connected to the grid $G1_b$ of the first triode T1. The input signal from the particle counter 10 to the triode T1, causes state 1 to progress one step around the ring.

The voltages to the proportional voltage generator **11*a* are taken from the right plates $P1_b$ through $P10_b$. A carry signal for advancing the first of the event decade counters is taken from plate $P10_b$. A reset signal for the pulse re-former 52** is taken from plate $P9_b$ of triode T9.

Figures 9, 10:
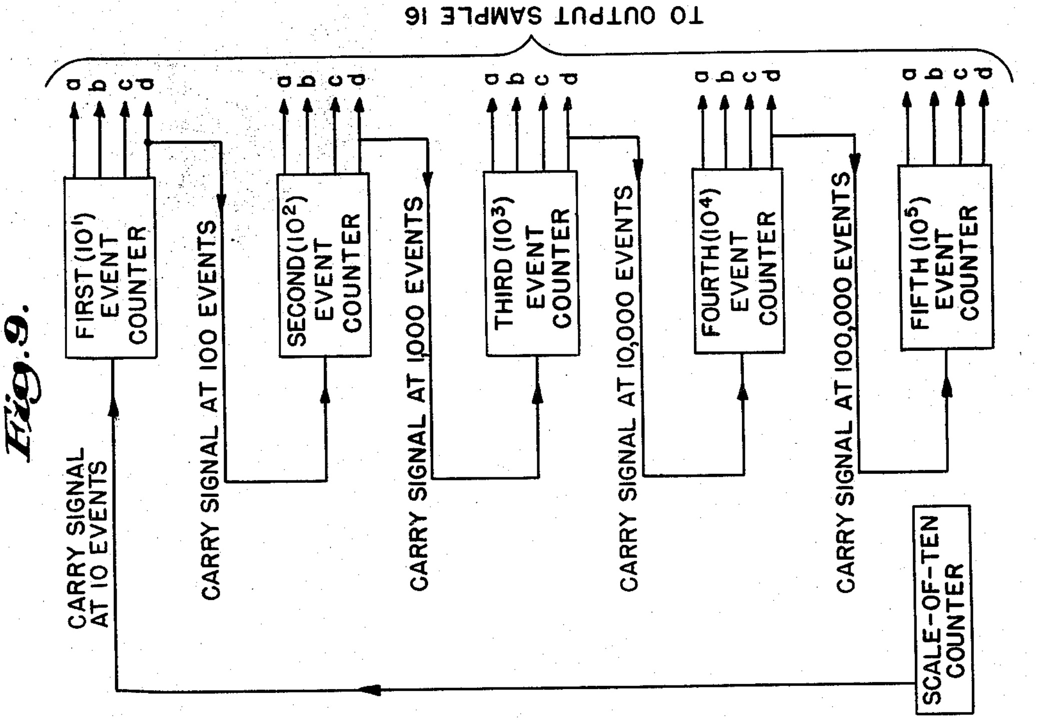
Fig. 9 is a diagrammatic view of the five event decade counters of Fig. 1, showing how they are connected.
Fig. 10 is a chart showing the digits at the output of the first counter of Fig. 9.

The decade counters **14*a* are five conventional, cascaded decade counters such as are widely used in digital computors. As shown by Fig. 9, the tenth count of the scale-of-ten counter 11 supplies a carry signal to the first of the event decade counters to cause the latter to advance one count. At the end of ten carry signals (100 events), from the counter 11, the first event decade counter will have advanced ten counts, and will deliver a carry signal to the second event decade counter to advance the latter one count. At the end of one hundred carry signals (1,000 events) from the counter 11, the second event decade counter will have advanced ten counts, and will deliver a carry count to advance the third event decade counter one count. At the end of one thousand carry signal (10,000 events) from the counter 11, the third event decade counter will have advanced ten counts, and will deliver a carry signal to advance the fourth event decade counter one count. At the end of ten thousand carry signals (100,000 events), from the counter 11**, the fourth event decade counter will have advanced ten counts, and will deliver a carry signal to advance the fifth event decade counter one count. At the end of one hundred carry signals (1,000,000 events), from the counter 11, the fifth decade counter will have advanced ten counts. The event decade counters can be reset automatically after they have advanced ten counts, or can be reset manually as desired.

Each of the event decade counters has outputs *a*, *b*, *c* and *d*, a signal being delivered from one or two of these outputs for each of the ten counts it advances. Fig. 10 shows how the outputs are coded as is standard in digital computers. Fig. 10 is for the first event decade counter. For the second, third, fourth and fifth counters, the outputs should be multiplied by $10^2$, $10^3$, $10^4$ and $10^5$ respectively.

A frequency standard 17, which may be a conventional crystal controlled oscillator, is connected to a conventional decade counter 18 which counts down the timing signals from the frequency standard 16 to a lesser rate, which signals are supplied into a conventional shaper circuit 19 which supplies peaked pulses to the input of a sampling pulse generator 20. The latter supplies peaked pulses to the output sampler 16 and to a conventional delay circuit 22, and supplies square wave pulses to a conventional intensity amplifier 24 which is connected to the cathode-grid circuit of the cathode ray tube 13.

Ten phototubes 0–9 are arranged opposite the face plate of the tube 13 so as to be exposed at different times to different positions of its beam as the latter is advanced in steps. The phototubes may be arranged in a single row, as illustrated, or may be arranged in multiple rows as disclosed in our said application, and may be fewer or more than ten in number.

As shown in Fig. 1, the phototubes are arranged in a single row with the phototube 0 opposite the zero position of the cathode beam of the tube 13, and the phototube 9 opposite the terminal position of the beam, the other phototubes 1–8 being spaced proportionate distances apart between the phototubes 0 and 9.

The outputs of the phototubes are supplied into the inputs of the corresponding discriminator circuits 25, the corresponding outputs of which are supplied into a least significant digit sampler 26. The output of the delay circuit 22 is also connected to the input of the sampler 26. The ten output circuits of the sampler 26 are connected to the inputs of ten conventional multivibrators 27 which deliver square wave pulses through corresponding amplifiers 28 into a magnetic tape recorder 30.

Figure 3A:
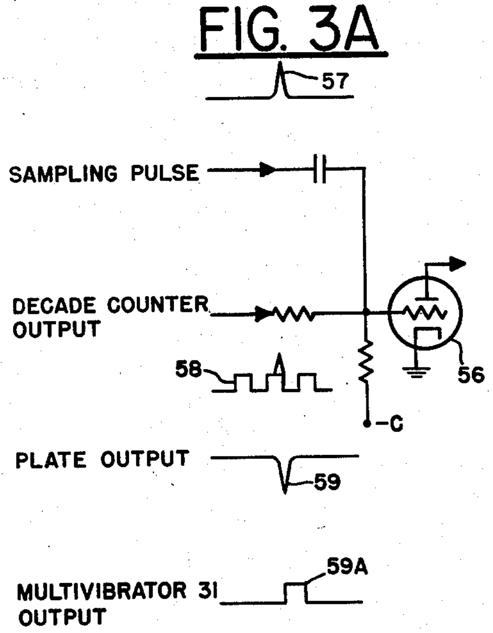
Fig. 3A is a circuit of a typical coincidence circuit that can be used in the output sampler of Fig. 1.

The twenty outputs of the sampler 16 are supplied into the inputs of corresponding multivibrators 31 which deliver square wave pulses through corresponding amplifiers 32 into the recorder 30. Fig. 3A shows a coincidence circuit that can be used in the output sampler 16 of Fig. 1. It consists of a triode 56 normally biased beyond cut-off, its plate being connected to the respective multivibrator 31. When a sampling pulse 57 arrives at the grid of the triode 56 in coincidence with an out put pulse 58 from the decade counters 14*a* the triode conducts, and delivers an output pulse 59 to the respective multivibrator 31, which, in turn, delivers a square wave pulse 59A to the respective amplifier 32.

Figure 3B:
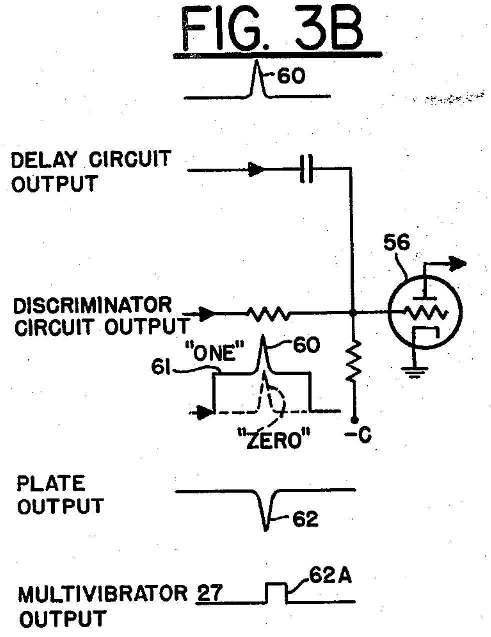
Fig. 3B is a circuit of a typical coincidence circuit that can be used in the least significant digit sampler of Fig. 1.

Fig. 3B shows a coincidence circuit that can be used in the least significant digit sampler 26. A pulse 60 from the delay circuit 22 arriving at the grid of triode 56 in coincidence with a respective pulse from the discriminator 25, causes the triode to conduct, and its plate to deliver an output pulse 62 to the respective multivibrator 27 which, in turn, delivers a square wave pulse 62A to the respective amplifier 28.

Figure 4:
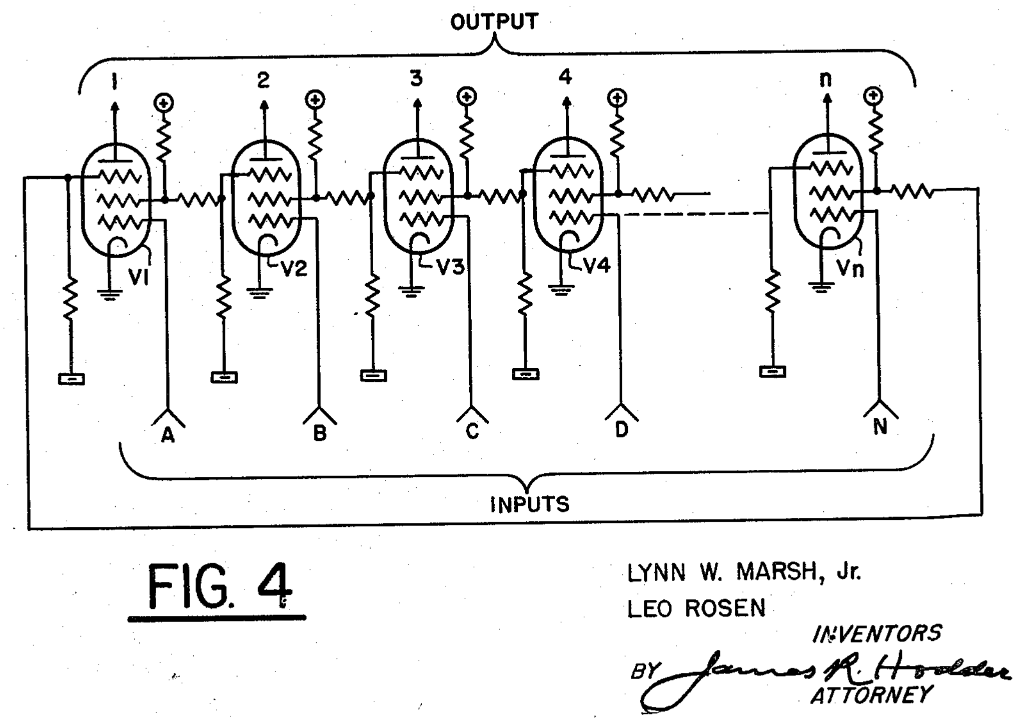
Fig. 4 is a circuit of a discriminator that can be used in the system of Fig. 1.

Fig. 4 illustrates a circuit that may be used for the discriminator 25. It consists of a series of *n* pentodes V1, V2, V3, V4, V5 . . . V*n* arranged in a loop circuit, the screen grids of preceding tubes being connected to the suppressor grids of adjacent following tubes. Input signals A, B, C, D . . . N from respective phototubes are supplied to the control grids of the pentodes. Each input signal will either cause full conduction or no conduction, no partial conduction being permitted, i.e., the grid signal causes the screen section of a pentode to act as an on-off switch. Accordingly, occurrence or non-occurrence of screen conduction by any pentode causes the direct connected supressor in the adjacent pentode to assume conditions prohibiting or admitting the possibility of conduction in the corresponding plate circuit, i.e., the suppressor signal causes the plate section of the pentode to act as an on-off switch which is in series with the on-off switch action of the screen section of the same pentode. The net effect approximates that of a set of two-circuit switches interconnected so that closing one switch opens an adjacent circuit at the same time it closes one of the two series contacts of its own circuit.

With the input lettering and output numbering shown by Fig. 4, an "on" condition of input A denies the possibility of conduction in output 2 and allows conduction in output 1 provided input N is not in an "on" condition also; B "on" denies conduction in output 3 and permits conduction in output 2 if A is "off"; C "on" denies conduction in output 4 and permits conduction in output 3 if B is "off," and so on. In the circuit of Fig. 4, "on" implies ground potential being applied to a control grid. For example, if B is "on," the grid of V2 is at ground potential, its screen is conducting and, therefore, holding the suppressor of V3 beyond cut-off potential; and although V3 may have screen conduction if C is "on," V3 cannot have plate conduction; but nothing can be said as to plate conduction of V2 unless the condition of input A is known, since the suppressor of V2 is controlled by the screen of V1.

Each of the pentodes thus acts as a control on the next higher numbered pentode (and the highest numbered pentode acts as a control on the lowest numbered pentrode). Then if the normal condition for all inputs is the "off" condition, i.e., control grids of all pentodes held beyond cut-off potential, there will normally be no screen or plate conduction in any pentode. Occurrence of "on" condition will result in both screen and plate conduction in the respective pentode. Occurrence of "on" condition on successively lettered inputs will result in screen conduction in all corresponding pentodes but plate conduction (and hence output) only in the lowest numbered corresponding pentode, giving due consideration to the fact that V*n* is a lower number than V1 when consecutive lettered inputs include N and A.

In the usage shown in a discriminator 25 and in similar usages, occurrence of more that one "on" condition is always an act of adjacent or consecutively lettered inputs so that but a single output lead is energized. Thus, as used in Fig. 1, a single output signal will be provided when adjacent phototubes are exposed to light caused by an intensified cathode ray sweep caused by a sampling pulse.

For the lettering of leads shown by Fig. 4, the lowest numbered output will be energized. If the lead order is reversed, the highest numbered output will be energized. The choice of order allows choice of the start or the end of the sampling pulse as the effective reading.

Figure 2:
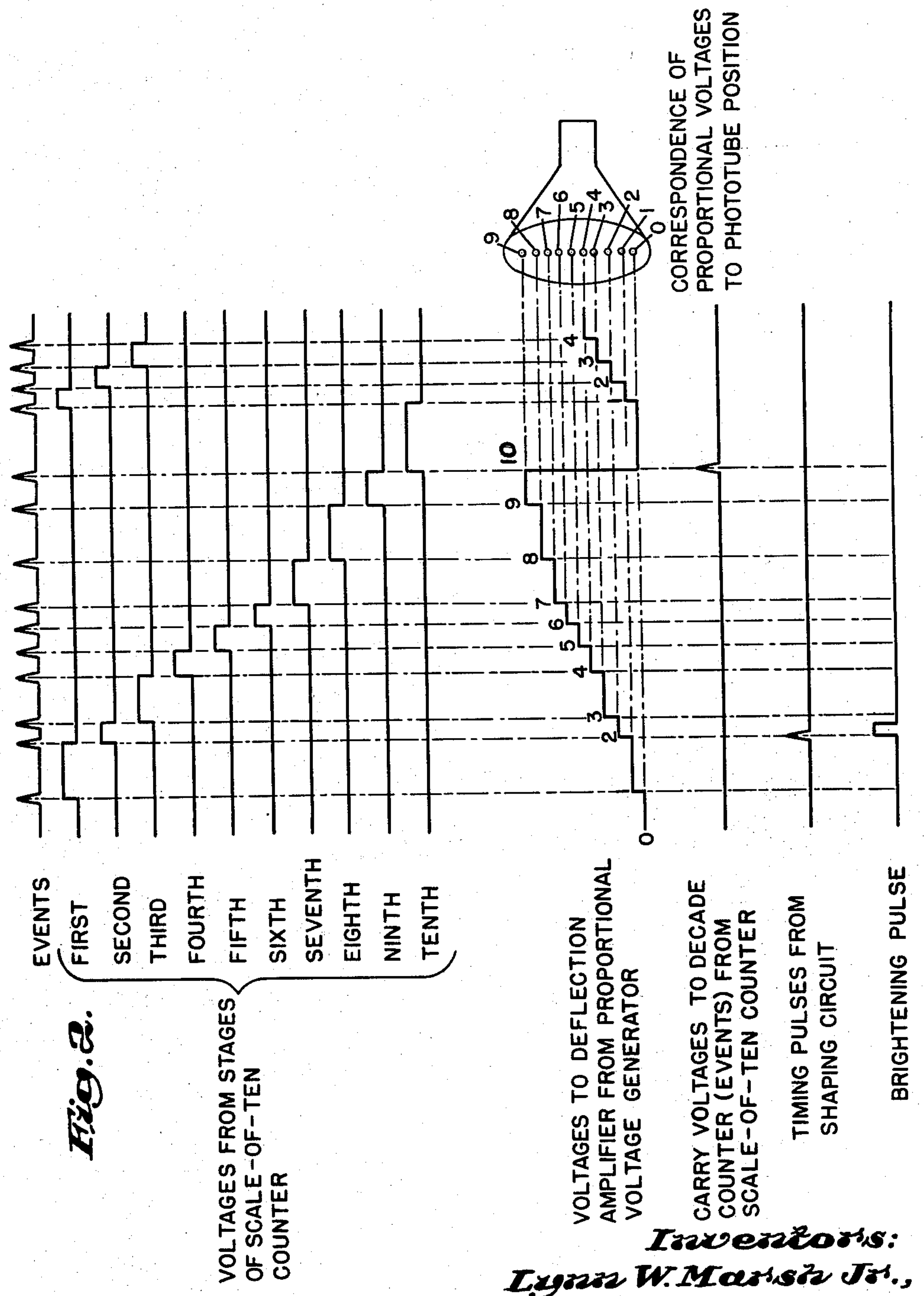
Fig. 2 is a chart showing voltage pulses at different points in the system of Fig. 1.

Fig. 5 shows a proportional voltage generator that can be used in the system of Fig. 1 to provide the ten deflection voltages shown by Fig. 2. The scale-of-ten counter 11 has its ten output leads from the right plates of Fig. 8 connected through resistors $R_0$–$R_9$ to the deflection amplifier 12, and through resistor $R_{10}$ to B+. The first signal from the counter 11 is supplied through the resistor $R_1$ which has a resistance $$\frac{10K}{1}$$

K being a constant. The second, third, fourth, fifth, sixth, seventh, eighth and ninth signals from the counter 11 are supplied through resistors $R_2$, $R_3$, $R_4$, $R_5$, $R_6$, $R_7$, $R_8$ and $R_9$ respectively, which have resistances $$\frac{10K}{2}, \frac{10K}{3}, \frac{10K}{4}, \frac{10K}{5}, \frac{10K}{6}, \frac{10K}{7}, \frac{10K}{8} \text{ and } \frac{10K}{9}$$

respectively. The tenth signal from the counter 11 is supplied through resistor $R_0$ which has a resistance $$\frac{10K}{0}$$

which is an infinite resistance. Thus, the voltages supplied to the amplifier 12 are stepped up as shown by Fig. 2 in the order of occurrence of signals from the counter 11, and the cathode ray tube beam is deflected by the stepped-up deflection voltages to positions shown by Fig. 2 corresponding to the occurrence of signals 1–9 from the counter 11. At the tenth event, the beam is returned to its 0 position.

Fig. 7 shows a sampling pulse generator that can be used in the system of Fig. 1. It consists of an overdriven amplifier 50 which squares up the pulse from the shaping circuit 19 and which has its output connected to the input of peaking circuit 51. The output of the latter is connected to the "set" input connection of a pulse re-former 52 which may be an Eccles-Jordan or similar bistable circuit; is connected to the input of multivibrator 53 which supplies square wave pulses to the intensity amplifier 24, and is connected to the delay circuit 22. The pulse re-former 52 has a "reset" input connection connected to the counter 11, and supplies a peaked output signal, when reset, to the output sampler 16. The pulse re-former is set by a time signal, and is reset by a number of events, and thus relates times and events.

The delay circuit 22 delays the signal to be used for sampling the least significant digit to allow the discriminator circuit 25 to stabilize. Descriptions of scale-of-ten counters and of decade counters may be found in Chapter 11 of the text-book "Pulse and Digital Circuits," by Jacob Millman and Herbert Taub, published in 1956 by McGraw-Hill Book Co., Inc. Descriptions of multivibrators may be found on pages 92–104 of "Principles of Radar," third edition, published in 1952 by McGraw-Hill Book Co., Inc.

*Operation*

In operation, voltage pulses from the particle counter 10, which may include a conventional amplifier, are supplied into the scale-of-ten counter 11 which supplies through the proportional voltage generator 11*a*, deflection voltages to the cathode ray tube 13. The first signal from the counter 10 would advance the cathode beam of the tube 13 from its zero position, where it is opposite phototube 0, to its first position opposite phototube 1. The second signal from the counter 10 would advance the cathode beam from opposite the phototube 1 to opposite phototube 2. The third signal from the counter 10 would advance the beam from opposite phototube 2 to opposite phototube 3.

Likewise, the fourth, fifth, sixth, seventh, eighth and ninth signals from the counter 10 would advance the beam of the tube 13 to opposite phototubes 4, 5, 6, 7, 8 and 9 respectively. The tenth signal from the counter 10 would reset the beam to its zero position opposite phototube 0, following which the beam would again be placed in front of other phototubes by other signals from the counter 10, repeating the cycle described in the foregoing. Fig. 2 shows how the deflection voltages from the counter 11 would cause the cathode beam to advance, each incoming signal causing the beam to advance one phototube position.

The counter 11 would also supply a carry voltage pulse for very tenth pulse from the particle counter 10, into the decade counters 14*a*, the outputs of which are supplied into the input of the output sampler 16 which contains twenty coincidence circuits as shown by Fig. 3A. Each carry pulse from the scale-of-ten counter 11 advances the first of the decade counters 14*a* one count as described in the foregoing.

The frequency standard 17 which may have a frequency of 10 kc., supplies time signals which are divided down in decade counter 18 to a suitable number of pulses per second, which, in general, is a rate slower than the average of the rate of signals from the particle counter 10. The pulses from the decade counter 18 are peaked in the shaping circuit 19 and supplied through the overdriven amplifier 50 and peaking circuit 51 of the sampling pulse generator 20 into the pulse re-former 52, setting the latter. The pulse re-former 52 is reset by pulses from the counter 11, and supplies peaked pulses when so reset, to the output sampler 16. The multivibrator 53 delivers a square wave pulse through the intensity amplifier 24 to the grid-cathode circuit of the cathode ray tube when the time interval decade counter 18 advances one count.

The peaked pulses from the generator 20 which arrive in coincidence in the output sampler 16 with output signals from the decade counters 14*a* cause the output sampler to supply output pulses which are converted into square wave pulses in the multivibrators, amplified in the amplifiers 32 and recorded in the recorder 30. The recorder 30 has twenty channels, four chanels per digit for five digits. These digits are of the order of $10^1$, $10^2$, $10^3$, $10^4$ and $10^5$.

The light from the tube 13 is normally too dim to cause the phototube before which it is positioned to deliver an output signal. When a square wave signal from the generator 20 is applied to the cathode-grid circuit of the tube 13, its beam is intensified sufficiently to cause the phototube before which it is positioned to deliver an output signal. The screen opposite this phototube will remain brightened for an interval less than the time ten events could be counted by the counter 11.

The outputs of the phototubes are supplied into the discriminator circuits 25 which, as explained in the foregoing, operate to supply a single output signal to the following circuit regardless of whether or not more than one phototube has responded to the intensified beam, the output signal in each case being limited to the first phototube to be affected.

The outputs of the discriminator circuits 25 are supplied into the least significant digit sampler 26 which contains ten coincidence circuits, as disclosed in the foregoing, wherein coincidences with pulses from the delay circuit 22 provide output signals which are converted into square wave pulses in the multivibrators 27, amplified in corresponding amplifiers 28 and recorded in the recorder 30. The recorder has ten channels for recording such pulses as least significant digits. The delay circuit allows time for proper phototube response and discriminator operation.

Figure 6:
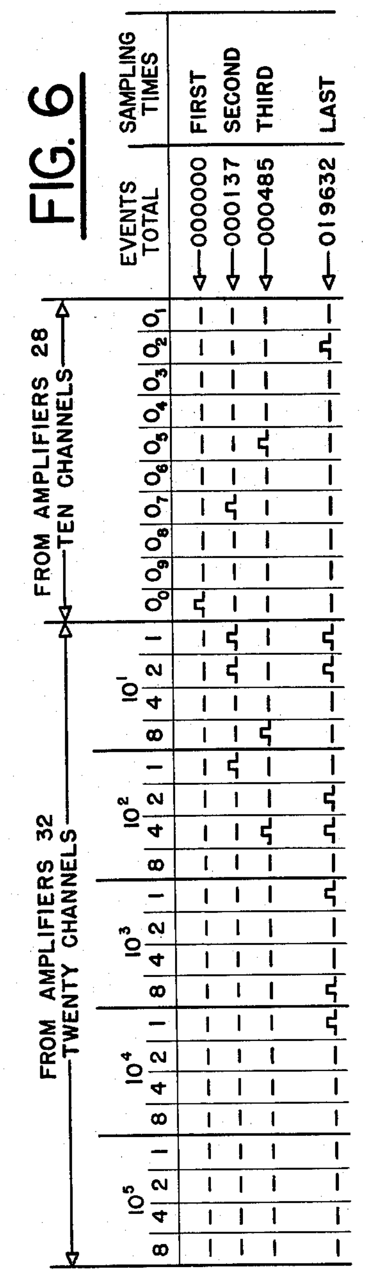
Fig. 6 is a chart showing how signals are recorded in the recorder of Fig. 1.
Figure 2:
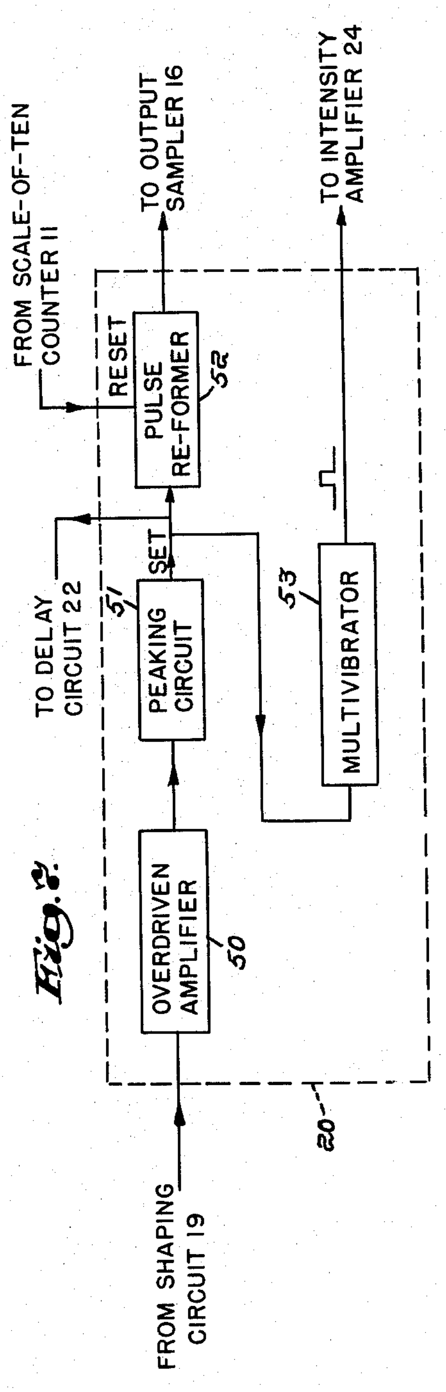

Fig. 6 shows how the signals are recorded in the recorder 30. The ten channels at the right of Fig. 6 are fed by the amplifiers 28 and are legended $0_1$, $0_2$, $0_3$, $0_4$, $0_5$, $0_6$, $0_7$, $0_8$, $0_9$ and $0_0$, in one of which each least significant digit is recorded. The twenty channels at the left of Fig. 6 are fed by the amplifiers 32. There are five digits legended $10^1$, $10^2$, $10^3$, $10^4$ and $10^5$, each having four channels legended 1, 2, 4 and 8. The 0 at the first time of sampling is recorded as $0_0$ since the counter 11 is at rest, and no voltage is delivered to deflect the cathode beam from its 0 position.

An event total at the second time of sampling (count of 000137 to be recorded) would result in the "7" being recorded as a 7 in the $0_7$ channel, the "3" as a 2 and a 1 in the $10^1$ channel, and the "1" being recorded as a 1 in the $10^2$ channel.

An event total at the third time of sampling (count of 000485 to be recorded) would result in the "5" being recorded as a 5 in the $0_5$ channel, the "8" being recorded as an 8 in the $10^1$ channel, and the "4" being recorded as a 4 in the $10^2$ channel.

An event total at the last time of sampling (count of 019632 to be recorded) would result in the "2" being recorded in the $10^0$ channel as a 2, the "3" being recorded as a 2 and a 1 in the $10^1$ channel, the "6" being recorded as a 4 and a 2 in the $10^2$ channel, the "9" being recorded as an 8 and a 1 in the $10^3$ channel, and the "1" being recorded as a 1 in the $10^4$ channel.

The number of input or event signals occuring within predetermined time intervals are thus recorded. Intensification of the cathode ray tube beam by time signals causes temporary storage in the cathode ray tube as a function of its phosphor decay-time characteristic, permitting the accumulated count of high speed event signals to be sample and recorded at much slower speeds.

It must be noted that events occurring at rates much lower than the time interval signals are counted correctly, the ratio of rates not being a necessary condition to operation.

From the foregoing, it should be apparent that the scale-of-ten counter 11 stores nine event signals, and when the tenth event signal arrives, the counter 11 supplies a carry signal to advance the first of the decade counters **14*a* one count. Every following tenth event signal causes a carry pulse to be supplied to the first of the counters 14*a*. Each time the latter receives ten carry counts, it supplies a carry count to the second of the counters 14*a* to advance the latter one count. Each time the second of the counters 14*a* receives ten carry signals from the first of the counters 14*a*, it supplies a carry signal to advance the third of the counters 14*a* one count. Each time the third of the counters 14*a* receives ten carry signals, it supplies a carry signal to advance the fourth of the counters 14*a* one count. Each time the fourth of the counters 14*a* receives ten carry signals, it supplies a carry signal to advance the fifth of the counters 14*a*** one count.

The pulse re-former 52 is set each time the shaping circuit 19 delivers a time signal through the overdriven amplifier 50 to it. The scale-of-ten counter 11 at every count of nine supplies a signal to reset the pulse re-former, causing it to deliver a gating signal to the output sampler 16.

The first of the decade counters **14*a* delivers ten digit signals of the order of $10^1$. When each of these signals arrives at the respective coincidence circuit of the output sampler 16**, in coincidence with a gating pulse from the pulse re-former of the sampling pulse generator, an output signal is generated, and recorded in the respective $10^1$ channel as shown by Fig. 6.

The second of the counters **14*a* delivers ten digit signals of the order of $10^2$. When each of these signals arrives at the respective coincidence circuit of the output sampler 16** in coincidence with a gating signal from the pulse re-former, an output signal is generated and recorded in the respective $10^2$ channel of the recorder.

In the same manner, the third, fourth and fifth of the counters **14*a*** act with the pulse re-former to record events of the order of $10^3$, $10^4$ and $10^5$ respectively.

Each event signal counted by the counter 11 causes the deflection electrodes of the cathode ray tube 13 to deflect the cathode beam opposite the respective phototube position as shown in Fig. 2. The beam is intensified by a pulse from the sampling pulse generator each time the shaping circuit 19 delivers a timing signal, and the phototube opposite the deflected beam is actuated by brightened light from the screen of the tube 13, and delivers an output ignal. When this output signal and a gating signal from the sampling pulse generator arrive in coincidence at the respective coincidence circuit of the least significant digit sampler 25, an output signal is generated and recorded in the respective $0_0$–$0_9$ channel of the recorder as shown by Fig. 6.

We claim:

1. A counting system comprising a cathode ray tube having a screen, deflection means for moving the beam of said tube across said screen in steps from a zero position to a maximum deflection position, a purality of spaced-apart phototubes arranged to be exposed to light from said screen opposite different steps of said beam, an input signal source, a source of timing signals, means actuated by signals from said input signal source for causing said deflection means to advance said beam from its zero position to its next adjacent position when the first input signal occurs, and successively to other positions when other input signals occur, and means including means actuated by signals from said timing signal source intensifying said beam when timing signals occur.

2. A counting system as claimed in claim 1, in which means is provided for returning said beam to said zero position when a predetermined number of input signals have occurred.

3. A counting system comprising a cathode ray tube having a screen; deflection means for moving the beam of said tube across said screen in steps from a zero position to a terminal position; a first phototube opposite and exposed to light from said screen caused by said beam when the beam is at said zero position; a plurality of other, spaced-apart phototubes opposite and exposed in succession to light from said screen caused by said beam when said beam moves from said zero to said terminal position, the last of said other photo-tubes being exposed to light from said screen caused by said beam when the beam is at said terminal position; a source of input signals to be counted; a source of timing signals; means connecting said input signal source to the deflection means and using a first signal from said input signal source for causing said deflection means to move said beam from said zero position to a position opposite the next adjacent of said phototubes, and using other successive signals from said signal source to cause said deflection means to move said beam opposite successive of said other phototubes, and when said beam has moved to said terminal position to cause said deflection means to move said beam back to said zero position; and means including means actuated by signals from said timing signal source for intensifying said beam.

4. A counting system as claimed in claim 3, in which a delay circuit is connected to said timing signal source for providing an output pulse delayed behind a corresponding time signal, and in which a plurality of coincidence circuits are connected to said phototubes and to said delay circuit, said coincidence circuits delivering output pulses when pulses from said phototubes and from said delay circuit arrive in coincidence.

5. A counting system as claimed in claim 4, in which a discriminator circuit is connected between said phototubes and said coincidence circuits for providing a single output signal when one or more phototubes are actuated by a brightened spot on said screen caused by a timing signal.

6. A counting system as claimed in claim 5 in which a discriminator circuit is connected to said phototubes for providing a single output signal when one or more phototubes are actuated by a brightened spot on said screen caused by a timing signal.

7. A counting system as claimed in claim 6 in which the means connecting the input signal source to the deflection means includes a scale-of-$n$ counter where $n$ is equal to or less than the number of phototubes.

8. A counting system as claimed in claim 7 in which a delay circuit is connected to said timing signal source for providing an output pulse delayed behind a corresponding timing signal, and in which a plurality of coincidence circuits are connected to the output of said discriminator circuit and said delay circuit, said coincidence circuits delivering output pulses when pulses from said discriminator and from said delay circuit arrive in coincidence.

9. A counting system as claimed in claim 3 in which the means connecting the signal input source to the deflection means includes a scale-of-$n$ counter where $n$ is equal to or less than the number of phototubes.

10. A signal-observing system comprising a cathode ray tube having a screen, deflection means for moving the cathode beam of said tube across said screen in steps from a zero position to a terminal position; a first phototube exposed to light from said screen caused by said beam when said beam is at said zero position; a plurality of other spaced-apart phototubes exposed in succession to light from said screen caused by said beam when said beam moves from said zero to said terminal position, the last of said phototubes in order of exposure to light from said screen caused by said beam being exposed to light from said screen caused by said beam when said beam is at said terminal position; a source of input signals to be observed; means connecting said input signal source to said deflection means, and using a first signal from said source for causing said deflection means to move said beam from said zero position to a position opposite the next adjacent of said phototubes, and using other successive signals from said source to move said beam opposite successive of said other phototubes and when said beam has moved to said terminal position, to cause said deflection means to move said beam back to said zero position.

11. A signal-observing system as claimed in claim 10, in which the said means using signals from said source includes a scale-of-$n$ counter where $n$ is equal to or less than the number of phototubes.

12. A counting system comprising a cathode ray tube having a screen; deflection means for moving the cathode beam of said tube across said screen in steps from a zero position to a terminal position; a first phototube opposite to and exposed to light from said screen caused by said beam when the beam is at said zero position; a plurality of other spaced-apart phototubes exposed in succession to light from said screen caused by said beam when said beam moves from said zero to said terminal position, the last of said phototubes in order being exposed to light from said screen caused by said beam when said beam is at said terminal position; a source of input signals to be counted, means including a scale-of-$n$ counter where $n$ is equal to or less than the number of said phototubes, connecting said input signal source and said deflecting means and using a signal from said source for causing said deflection means to move said beam from opposite said first phototube to a position opposite the next adjacent of said other phototubes and using other successive signals from said source to cause said deflection means to move said beam opposite successive of the remaining phototubes, and when said beam has moved opposite said last of said remaining phototubes to move said beam back to said zero position; a first decade counter connected to said scale-of-$n$ counter; a source of timing signals; a second decade counter connected to said timing signal source; a sampling pulse generator connected to said second counter; a plurality of coincidence circuits connected to said first decade counter; a recorder connected to said circuits; means connecting said generator to said circuits, said circuits supplying signals to said recorder when signals from said first counter and from said generator arrive in coincidence; means connecting said generator to said tube for causing brightened spots on said screen when signals from said generator occur; a discriminator circuit connected to said phototubes for supplying a single output signal when one or more of said phototubes are actuated by a brightened spot on said screen; a plurality of coincidence circuits connected to said discriminator circuit; a delay circuit connected to said generator and to said last mentioned coincidence circuits; and means connecting said last mentioned coincidence circuits to said recorder, said last mentioned discriminator circuits supplying signals to said recorder when signals from said delay circuit and said discriminator circuit arrive in coincidence.

13. A counting system comprising a source of input signals to be counted, a scale-of-$n$ counter connected to said source, a sampling pulse generator connected to said counter, a source of time interval signals connected to said generator, a plurality of cascaded decade counters, each having a plurality of outputs and an input, the input of the first of said decade counters being connected to said scale-of-$n$ counter, the input of each following decade counter being connected to an output of the adjacent preceding decade counter, an output sampler connected to said outputs of said decade counters and to said generator, a recorder connected to said output sampler, said generator including bistable means set by a signal from said time interval source and reset by a signal from said scale-of-$n$ counter when the latter has counted one less than $n$ signals from said signal input source, and delivering an output signal when reset to said output sampler, said scale-of-$n$ counter delivering a carry signal to said input of said first decade counter when $n$ signals from said input signal source have been counted, each of the following decade counters receiving a carry count from the adjacent preceding decade counter when the latter has received $n$ carry counts, each of said decade counters delivering a signal at one of its outputs when it has received a carry signal, said generator including means for delivering an output signal to said output sampler when a signal from said time interval signal source arrives at said generator, said output sampler including means generating a signal to be recorded when a signal from said generator arrives at said sampler in coincidence with a signal from an output of one of said decade counters, and means connected to said output sampler and to said recorder for supplying said signal to be recorded to said recorder.

14. A counting system as claimed in claim 13 in which a least significant digit sampler is provided and connected to said recorder, in which a delay circuit is provided and which connects said least significant digit sampler to said generator, said generator including means for delivering a signal to said least significant digit sampler when a signal from said time interval signal source arrives at said generator, in which means including means conncted to said scale-of-$n$ counter and to said least significant digit sampler is provided for delivering a signal to said least significant digit sampler for each signal from said signal input source counted by said scale-of-$n$ counter, said least significant digit sampler including means for generating a signal to be recorded when a signal from said last mentioned means and a signal from said generator arrive in coincidence at said least significant digit sampler, and in which means is provided and connected to said least significant digit sampler and to said recorder for supplying said signal to be recorded to said recorder.

References Cited in the file of this patent

UNITED STATES PATENTS

| | | |
|---|---|---|
| 2,527,512 | Arditi | Oct. 31, 1950 |
| 2,534,369 | Ress | Dec. 19, 1950 |
| 2,568,449 | Hansen | Sept. 18, 1951 |
| 2,702,158 | Winter | Feb. 15, 1955 |